United States Patent Office 2,948,530
Patented Aug. 9, 1960

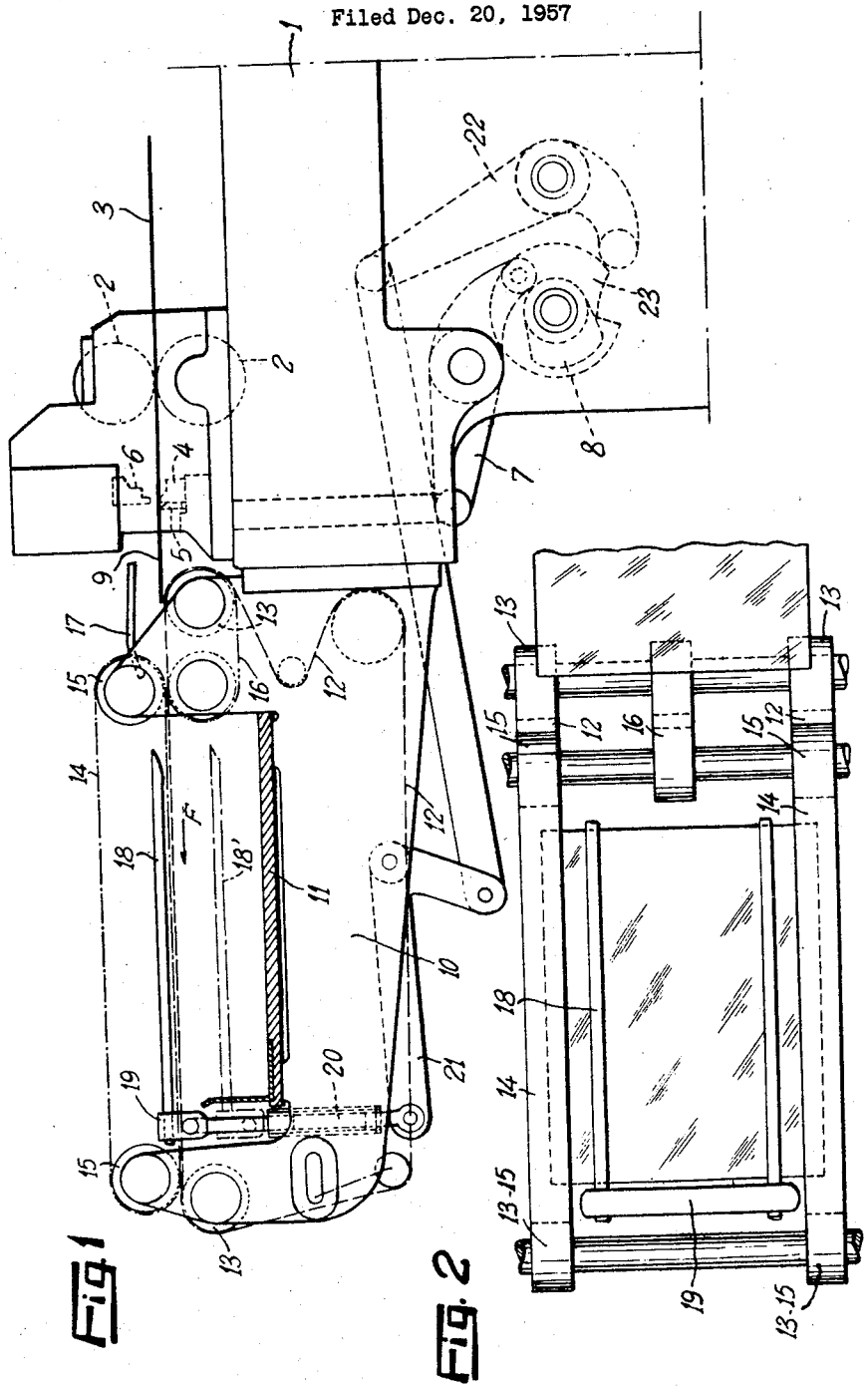

2,948,530

APPARATUS FOR RECEIVING AND STACKING BAGS

Maurice Louis van de Gent, "Gentiana" Dreve du Chateau Royal Meisse B.T., Brussels, Belgium Filed Dec. 20, 1957, Ser. No. 704,094

Claims priority, application France Dec. 21, 1956

2 Claims. (Cl. 271—68)

The present invention is an improvement in machines which manufacture bags by welding tubes or sheets of thin thermoplastic material, for instance polyethylene, but it also applies to machines manufacturing light bags made of any other material. It is an object of the present invention to obviate the difficulty encountered in receiving and stacking such bags, which, due to their lightness and to distortion by the welding stresses and electrostatic charges, tend to fly away haphazardly at the exit of the welding and cutting machine.

The apparatus comprises essentially two sets of lateral belts forming endless conveyors, each set including two belts pressing one against the other, the entry of which is directed towards the exit of the machine, and which are adapted to convey the bag the longitudinal edges of which are nipped between said belts, and mechanical means lying over a reception box and receiving a vertical discontinued movement, the bags entering in succession under said means which free them from the belts and stack them in the box.

Other features of the invention will become apparent from the description of an example which will be described hereunder with reference to the accompanying drawings in which:

Fig. 1 is a side elevation of the machine and the mechanical means according to the invention.

Fig. 2 is a plan view of the mechanical means according to the invention.

The welding machine comprises a frame 1, on which are mounted two nip rollers 2, conveying the tube or the films to be welded 3, a lower electrode 4 and a cutting knife 5 cutting the tube or films to length, as well as supports for a top electrode 6, temporarily applied against the electrode 4 by control levers 7 controlled by a cam 8.

The bag formed in 9 at the exit of the welding jaws tends to stand up and fly away. In order to control the bag and to stack it, the device comprises on the exit table of the machine, a frame 10 which carries a reception box 11. In this frame 10 are transversally mounted two shafts carrying pulleys for endless belts.

Two such belts 12 run over pulleys 13 in order that their upper course is comprised in the horizontal plan of the lower electrode 4. Viewed in plan their central axes come on each side of the longitudinal axis of the machine so as to be separated by a distance corresponding substantially to the width of the bag. On the other hand these belts 12 run over driving pulleys 13 and are driven in the direction of the arrow F, the forward pulley 13 being as close as possible to the welding jaws.

Two other belts 14 running over pulleys 15 co-operate with the belts 12 in order that the lower course of each belt 14 comes against the upper course of the corresponding belt 12 and moves in the direction of the arrow F. The forward pulleys 15 are placed slightly back of the forward pulleys 13 to give access to the welding jaws. An auxiliary belt 16 assists the belts 12 centrally of that portion of said belts which projects forward of belts 14 to avoid the bags sagging downwards before being nipped by the lateral edges of the belts. A guiding plate 17 may also be placed between the belts 14 and the welding jaws to avoid the bags escaping upwardly. This plate 17 will preferably be a plastic material casting.

It is clear from the above description that the bag coming out of the welding machine will be nipped by its edges between the conveying belts 12 and 14 and carried away in the direction of the arrow F. The bag then comes under two longitudinal rods 18 in parallel relationship to the belts and adjacent thereto, these rods being carried by a transverse bracket 19, which receives through sliding rods 20, linkage 21 and lever 22, cooperating with a cam 23, an intermittent downward movement bringing the rods 18 in position 18' shown in chain lines. This movement is synchronised with the operation of the jaws, the cams 8 and 23 being mounted on the same shaft. The bag is thus freed from the belts 12 and 14 and applied on the stack in the reception box 11.

It will be apparent that various changes and modifications may be made without departing from the scope of the present invention.

I claim:

1. Apparatus for stacking thin plastic bags received from the exit of a welding and cutting machine in which the bags are produced from thermoplastic material; said apparatus comprising at least two sets of endless conveyor belts extending longitudinally from the exit of the welding and cutting machine and being laterally spaced apart so as to engage the bags received from said exit along the opposite longitudinal edges of the bags, each of said sets including upper and lower belts having straight lower and upper runs, respectively, pressing against each other to nip the related longitudinal edge of the received bag therebetween, said lower belt of each set extending closely adjacent to said exit of the welding and cutting machine, while the related upper belt is spaced longitudinally away from said exit by a substantial distance, a receptacle for the bags underlying said straight runs of the endless conveyor belts, an auxiliary lower conveyor belt disposed laterally between said sets and having an upper run at the level of said upper runs of the first mentioned lower conveyor belts, said upper run of the auxiliary lower conveyor belt being substantially coextensive longitudinally with the portions of said upper runs of said first lower belts extending between said exit and said upper belts, thereby to avoid downward sagging of the received bags before the longitudinal edges of the latter are nipped between said sets of conveyor belts, longitudinal rods extending parallel to said straight runs of the sets of conveyor belts and arranged in the space between said sets and adjacent to the latter, a lateral bracket fixedly secured to said rods at the ends of the latter remote from said exit of the welding and cutting machine, rectilinearly movable support means rigidly carrying said bracket and disposed at the side of said receptacle remote from said exit to permit movement of said rods in directions perpendicular to the plane of said straight runs of the sets of conveyor belts while maintaining the parallel relationship between said rods and said straight runs, and mechanical means effecting intermittent, reciprocating movement of said support means to move said rods from a raised position above the level of said straight runs to a lowered position below said level so that said rods act downwardly and uniformly upon a bag to free the longitudinal edges of the bag from said straight runs and to deposit the freed bag in said receptacle.

2. Apparatus as in claim 1; further comprising a guide plate above the level of said straight runs of the sets of conveyor belts and disposed between said upper belts and the exit of the welding and cutting machine to direct the bags discharged from said exit between said pressed together straight runs.

References Cited in the file of this patent
UNITED STATES PATENTS

| | | |
|---|---|---|
| 457,187 | Eckerson | Aug. 4, 1891 |
| 478,347 | Meisel | July 5, 1892 |
| 815,008 | Davidson | Mar. 13, 1906 |
| 1,133,959 | Henderson | Mar. 30, 1915 |